US007962953B2

(12) United States Patent
Chandra et al.

(10) Patent No.: US 7,962,953 B2
(45) Date of Patent: Jun. 14, 2011

(54) DRM PROTECTED CONTENT SHARING

(75) Inventors: Umesh Chandra, Allen, TX (US); David Leon, Irving, TX (US); Sanjeev Verma, San Diego, CA (US)

(73) Assignee: Nokia Corporation (FI)

( * ) Notice: Subject to any disclaimer, the term of this patent is extended or adjusted under 35 U.S.C. 154(b) by 1081 days.

(21) Appl. No.: 11/617,306

(22) Filed: Dec. 28, 2006

(65) Prior Publication Data

US 2008/0162641 A1 Jul. 3, 2008

(51) Int. Cl.
*G06F 15/16* (2006.01)
*G06F 17/00* (2006.01)
*G06F 17/30* (2006.01)

(52) U.S. Cl. .............................. 726/4; 709/206; 707/626

(58) Field of Classification Search ...... 726/4; 709/206, 709/249, 237, 227, 229; 707/626
See application file for complete search history.

(56) References Cited

U.S. PATENT DOCUMENTS

2007/0027814 A1 2/2007 Tuoriniemi

FOREIGN PATENT DOCUMENTS

WO 2004/102459 11/2004

OTHER PUBLICATIONS

Harrowell (A pointless multimedia subsystem?; Alexander Harrowell Publication: Mobile Communications International Date: Sunday, Oct. 1, 2006).*

An Efficient Key Distribution Method Applying to OMA DRM 2.0 with Device Identifier; Zonghua Liu; Guangqing Liu; Byungwook Lee; Software Engineering, Artificial Intelligence, Networking, and Parallel/Distributed Computing, 2008. SNPD '08. Ninth ACIS International Conference on; Publication Year: 2008 , pp. 3-7.*
Extending an OMA-based DRM framework with non-repudiation services; Onieva, J.A.; Lopez, J.; Jianying Zhou; Roman, R.; Signal Processing and Information Technology, 2005. Proceedings of the Fifth IEEE International Symposium on; Publication Year: 2005 , pp. 472-477.*
Secure and Flexible Digital Rights Management in a Pervasive Usage Mode; Zhaofeng, Ma; Yixian, Yang; Xinxin, Niu; Computational Intelligence and Security, 2007 International Conference on; Publication Year: 2007 , pp. 863-867.*
International Preliminary Report on Patentability dated Jun. 30, 2009 in Application No. PCT/IB2007/003880.
OMA: "DRM Architecture Approved Version 2.0—Mar. 3, 2006, Open Mobile Alliance, OMA-AD-DRM-0V2_0-20060303-A," Open Mobile Alliance Ltd, 2006, pp. 1-24.
"$3^{rd}$ Generation Partnership Project; Technical Specification Group Services and System Aspects; Transparent and-to-end Packet-switched Streaming Service (PSS); Protocols and Codecs," 3GPP: 3GPP TS 26.234 v. 7.0.0, http://www.3GPP.org, Sep. 2006.

(Continued)

*Primary Examiner* — David Y Jung
(74) *Attorney, Agent, or Firm* — Banner & Witcoff, Ltd.

(57) ABSTRACT

A system and method for transmitting protected real-time content from one user to another is described. In a first aspect, a user sends a Rights Object to another user. In a second aspect, a user sends a Rights Object to another user via an intermediate server for a multiparty communication. In this second aspect, the users may be able to switch between designated Rights Objects as needed.

22 Claims, 10 Drawing Sheets

OTHER PUBLICATIONS

"3rd Generation Partnership Project; Technical Specification Group Services and System Aspects; Transparent and-to-end Packet-switched Streaming Service (PSS); Protocols and Codecs," 3GPP: 3GPP TS 26.234 v. 6.6.0, http://www.3GPP.org, Dec. 2005.

"DRM Architecture," Open Mobile Alliance: OMA-AD-DRM-V2_0-20060303-A, http://www.openmobilealliance.org/ipr.html, Mar. 3, 2006.

"Enabler Release Definition for DRM V2.0," Open Mobile Alliance: OMA-ERELD-DRM-V2_0-20060303-A, http://www.openmobilealliance.org/ipr.html, Mar. 3, 2006.

"OMA DRM Requirements," Open Mobile Alliance: OMA-RD-DRM-V2_0-20060303-A, http://www.openmobilealliance.org/ipr.html, Mar. 3, 2006.

"DRM Content Format," Open Mobile Alliance: OMA-TS-DRM-DCF-V2_0-2006030 3-A, http://www.openmobilealliance.org/ipr.html, Mar. 3, 2006.

"DRM Specification," Open Mobile Alliance: OMA-TS-DRM-V2_0-20060303-A, http://www.openmobilealliance.org/ipr.html, Mar. 3, 2006.

"DRM Rights Expression Language," Open Mobile Alliance: OMA-TS-DRM-REL-V2_0-20060303-A, http://www.openmobilealliance.org/ipr.html, Mar. 3, 2006.

Kutscher, et al., "Session Description and Capability Negotiation," The Internet Society, http://www.ietf.org/ietf/mmusic-sdpng-08.txt, Feb. 20, 2005.

Rosenberg, et al., "A Session Initiation Protocol (SIP) Event Package for Conference State," The Internet Society, http://www.ietf.org/ietf/sipping-conference-package-12.txt, Jul. 1, 2005.

Notification of Transmittal of the International Search Report and Written Opinion dated Sep. 15, 2008 in Application No. PCT/IB2007/003880.

Dr. Renato Iannella, "The Open Digital Rights Language: XML for Digital Rights Management", 2004, pp. 47-55, vol. 9, No. 2, Elsevier Ltd.

Kutscher, "Session Description and Capability Negotiation", Feb. 20, 2005, pp. 1-61.

Safavi-Naini Reihaneh et al, "Import/Export in Digital Rights Management", Oct. 25, 2004, pp. 99-110.

Yan Liu, "Protecting Privacy of Personal Content on an OMA DRM Platform", Jun. 2005, pp. 1-68.

* cited by examiner

DRM PROTECTED CONTENT SHARING

FIELD OF THE INVENTION

This invention relates generally to the sharing of information.

BACKGROUND OF THE INVENTION

Content sharing between multiple users is increasing. One standard OMA DRM v.2 (of Mar. 15, 2004) describes the use of Rights Objects as being distributable to users' devices. The users' devices with the Rights Objects may then view content provided from a central source based on the receipt of the Rights Objects from the central source.

However, this standard does not address protected real-time multimedia sharing in point-to-point and multiparty communications.

SUMMARY OF THE INVENTION

This summary is provided to introduce a selection of concepts in a simplified form that are further described below in the Detailed Description. This summary is not intended to identify key features or essential features of the claimed subject matter.

In a first aspect of the present invention, one or more Rights Objects may be transmitted between users' systems, thereby enabling point-to-point transmissions of protected content. The Rights Objects may be generated locally or received from a remote source.

In a second aspect of the present invention, one or more Rights Objects may be transmitted from a first user's system to other users' systems via a central server, thereby enabling multiparty communications using the protected real-time multimedia.

These and other aspects of the disclosure will be apparent upon consideration of the following detailed description of illustrative embodiments.

BRIEF DESCRIPTION OF THE DRAWINGS

A more complete understanding of the present invention and the potential advantages thereof may be acquired by referring to the following description of illustrative embodiments in consideration of the accompanying drawings.

DETAILED DESCRIPTION OF THE INVENTION

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between elements in the following description. It is noted that these connections in general and, unless specified otherwise, may be direct or indirect and that this specification is not intended to be limiting in this respect.

OMA DRMv2.0 introduces the concept of Domains that can be used for interactive sharing of content in a conference call. An OMA DRMv2.0 domain is a set of devices that possess a common Domain key provisioned by a Rights Issuer (which may or may not be a content provider). The devices belonging to a domain can share a Domain Rights Object (RO) protected by the Domain key. The Domain RO defines the constraints regarding the content that can be shared among the devices belonging to the domain. Thus, devices in a Domain may share Domain Rights Objects and are able to consume and share any DCFs controlled by Domain Rights Objects. The OMA DRM domain concept is network centric. Here, a rights issuer (RI) defines the Domains, manages the Domain keys, and controls which and how many Devices are included and excluded from the Domain. A user may request to add a device to a Domain before acquiring Domain-bound content (MUST for real-time content), or make these requests incrementally after receiving Domain-bound content (Non real-time content).

OMA DRMv2.0 Domain concept can be used to support content sharing in a conference call. It can be achieved as follows:
  a. The content to be shared is protected using CEK (content encryption key). The CEK along with associated rights are packaged in Domain Rights Object (DRO). The CEK in the DRO is protected using domain key;
  b. The DRO associated with the content is distributed by the user who shares the media (in the following examples, user 1); and
  c. Other participants who belong to the domain are able to decrypt the stream and follow the content usage rights. If they do not belong to the domain, they can initiate the join domain procedure.

The following described mechanism uses OMA DRMv2.0 domain mode of operation and SIP protocol to share protected content in a point-to-point and multiparty conferencing environment.

Figure 1:
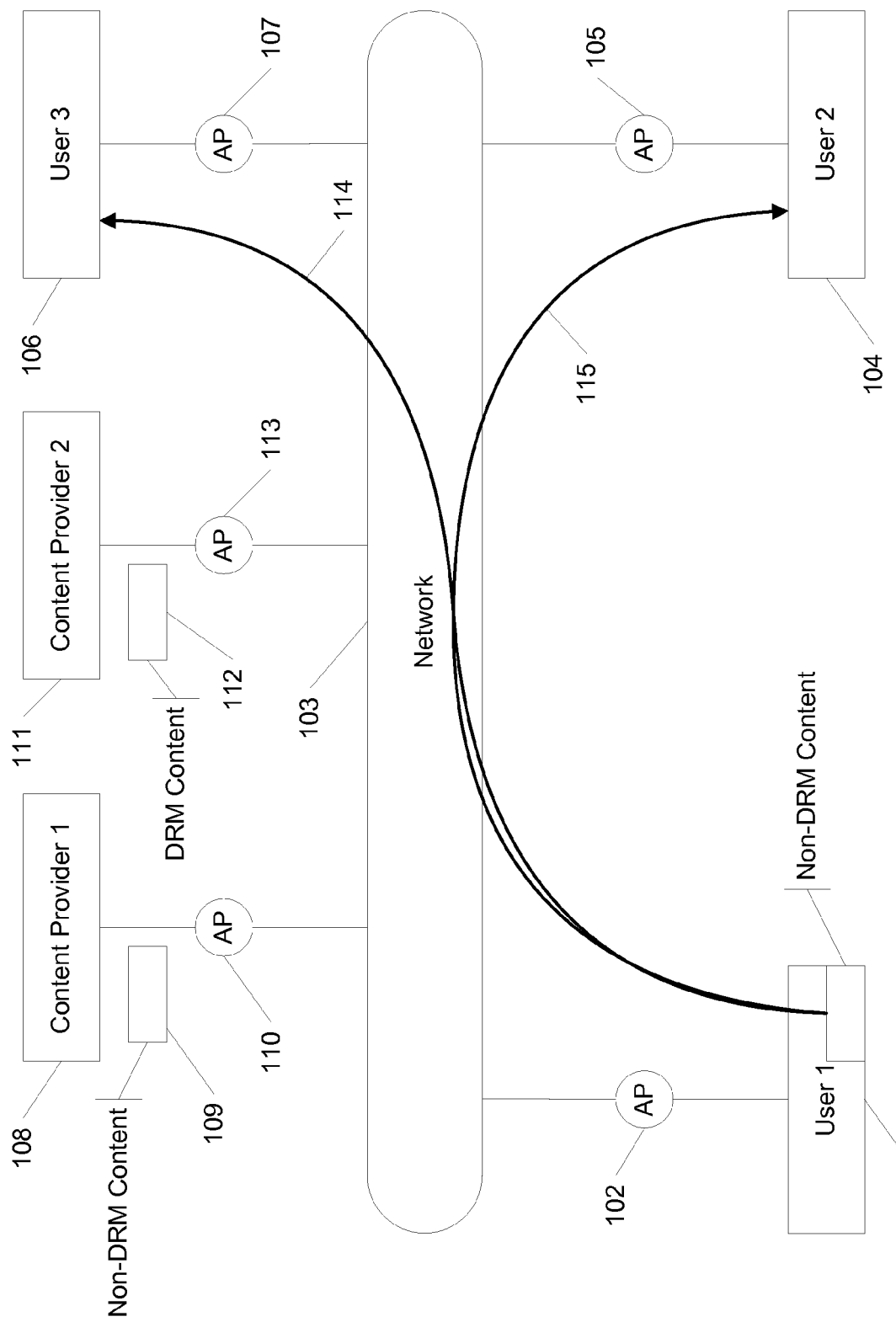
FIG. 1 shows content from a first user being distributed to other users.

The following abbreviations are used herein:
OMA—Open Mobile Alliance
DRM—Digital Rights Management
RO—Rights Object
SDP—Session Description Protocol
RTP—Real Time Protocol
SSRC—Synchronization Source CSRC—Contributing Source MCU—Media Control Unit FIG. 1 shows content from a first user being distributed to other users. FIG. 1 shows a user 1 101 with unprotected (non-DRM) content. The user 1 101 is connected to a network 103 via an access point 102. The access point may be a wired or wireless access point as is appreciated in the art. FIG. 1 also shows additional users (user 2-3 104, 106) connected through access points as well 105, 107. Content Provider 1 108 and Content Provider 2 111 are connected to network 103 via access points 110 and 113, respectfully. One or more of the devices or servers shown in FIG. 1 may have one or more inputs, one or more outputs, one or more processors, and one or more storage devices, as is known in the art to be able to exchange information and transfer objects as described herein. For purposes of explanation, the various end users' devices are described as "users" as the devices enable the use of content by an end user. It is appreciated that the devices are able to at least receive and handle Rights Objects as described herein.

Here, a user 1 101 may transmit unprotected content to user 2 104 and user 3 106 As shown by arrows 114 and 115.

Figure 2:
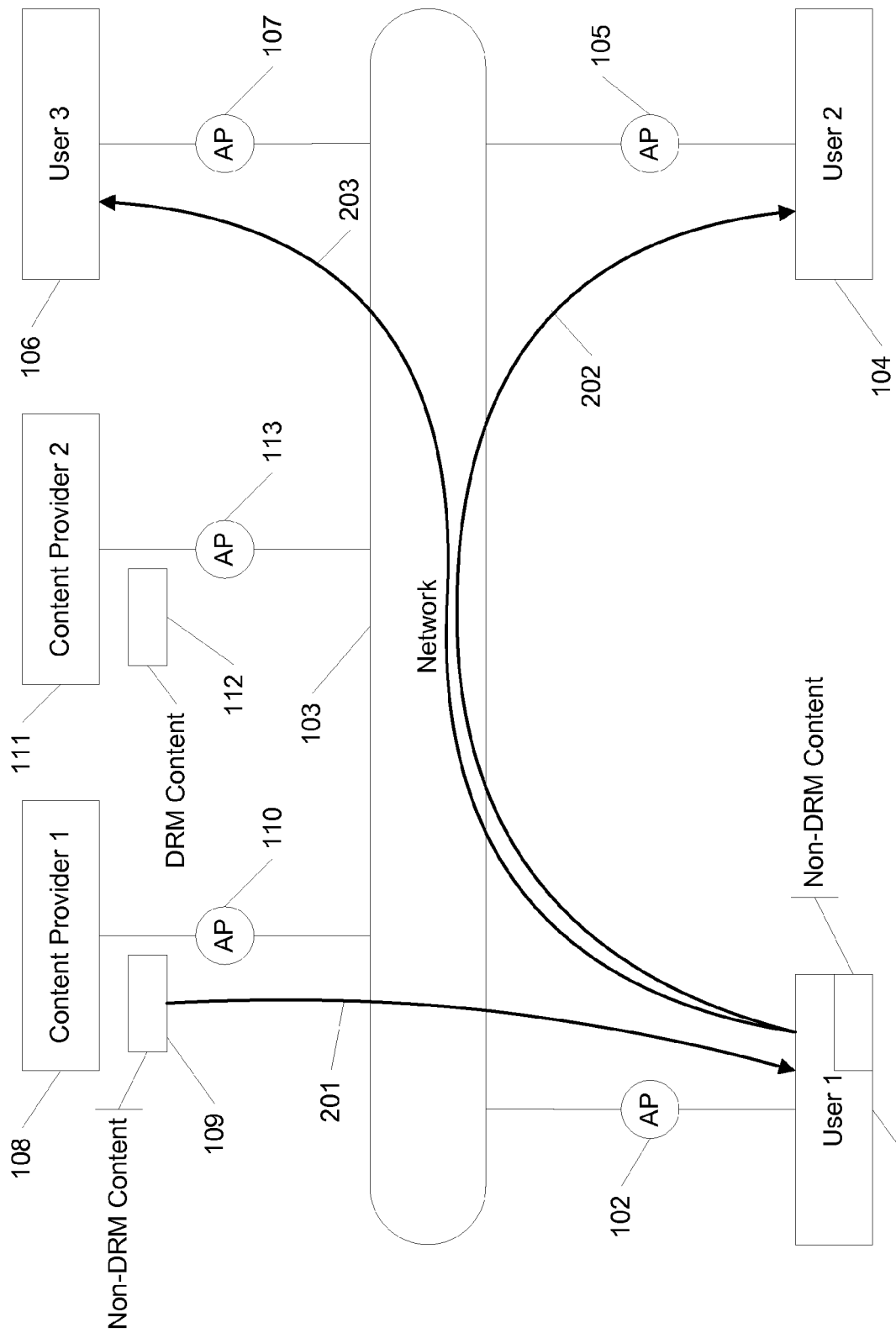
FIG. 2 shows unprotected content being transmitted from a content provider to a first user then to various users.

FIG. 2 shows unprotected content being transmitted from a content provider to a first user then to various users. Here, content provider 1 108 transmits non-DRM content 109 to user 1 101 first as shown by arrow 201, who then may subsequently forward (arrows 202 and 203) the non-DRM content to users 2 104 and 3 106 as shown with respect to FIG. 1.

Figure 3:
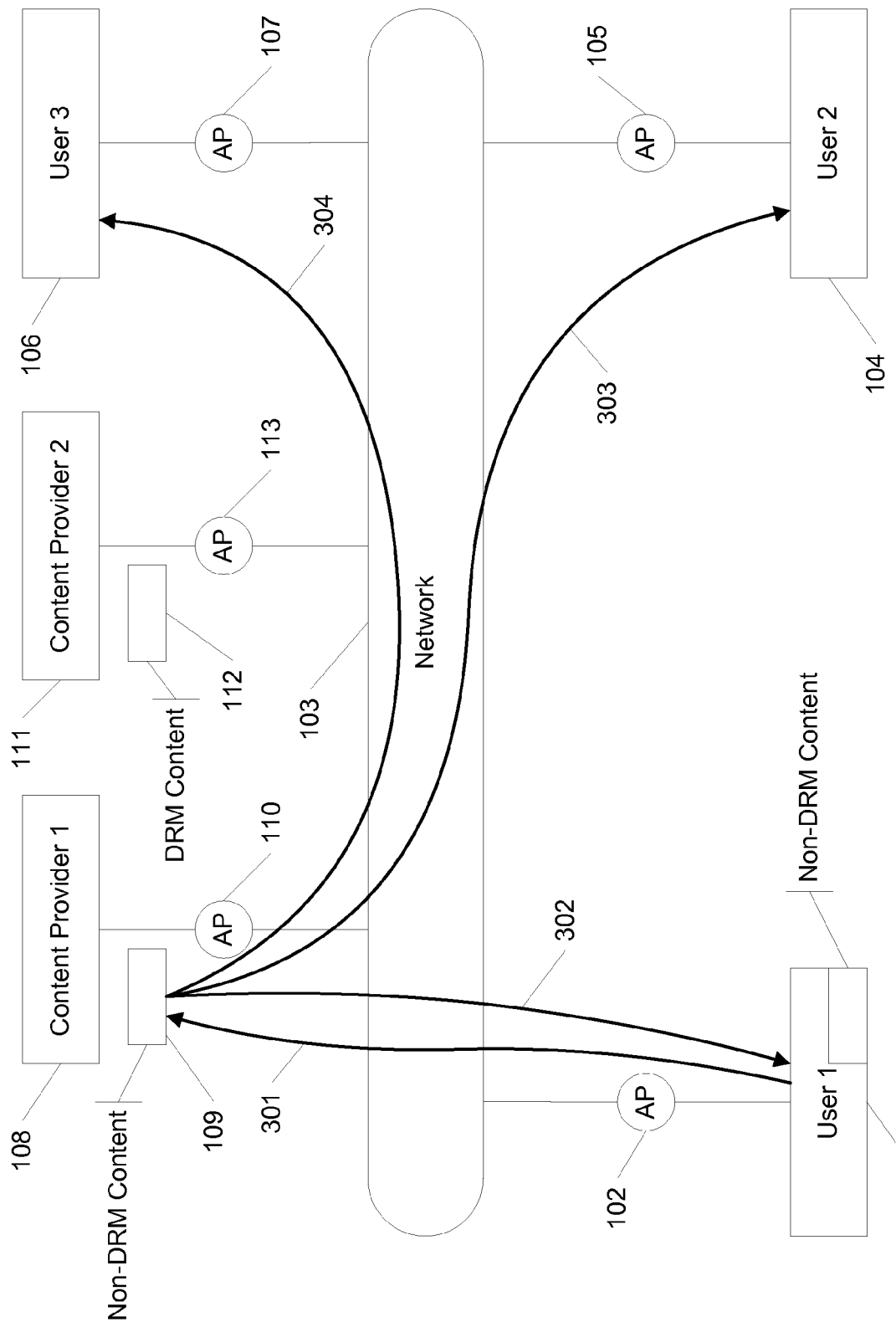
FIG. 3 shows unprotected content being transmitted from a content provider to various users.

FIG. 3 shows unprotected content being transmitted from a content provider to various users. User 1 101 transmits instructions 301 to content provider 1 108 to transmit non-DRM content 109 to users 1 101, 2 104, and 3 106. Next, as shown by arrows 302, 303, and 304, the non-DRM content is provided to users 1 101, 2 104, and 3 106.

Figure 4:
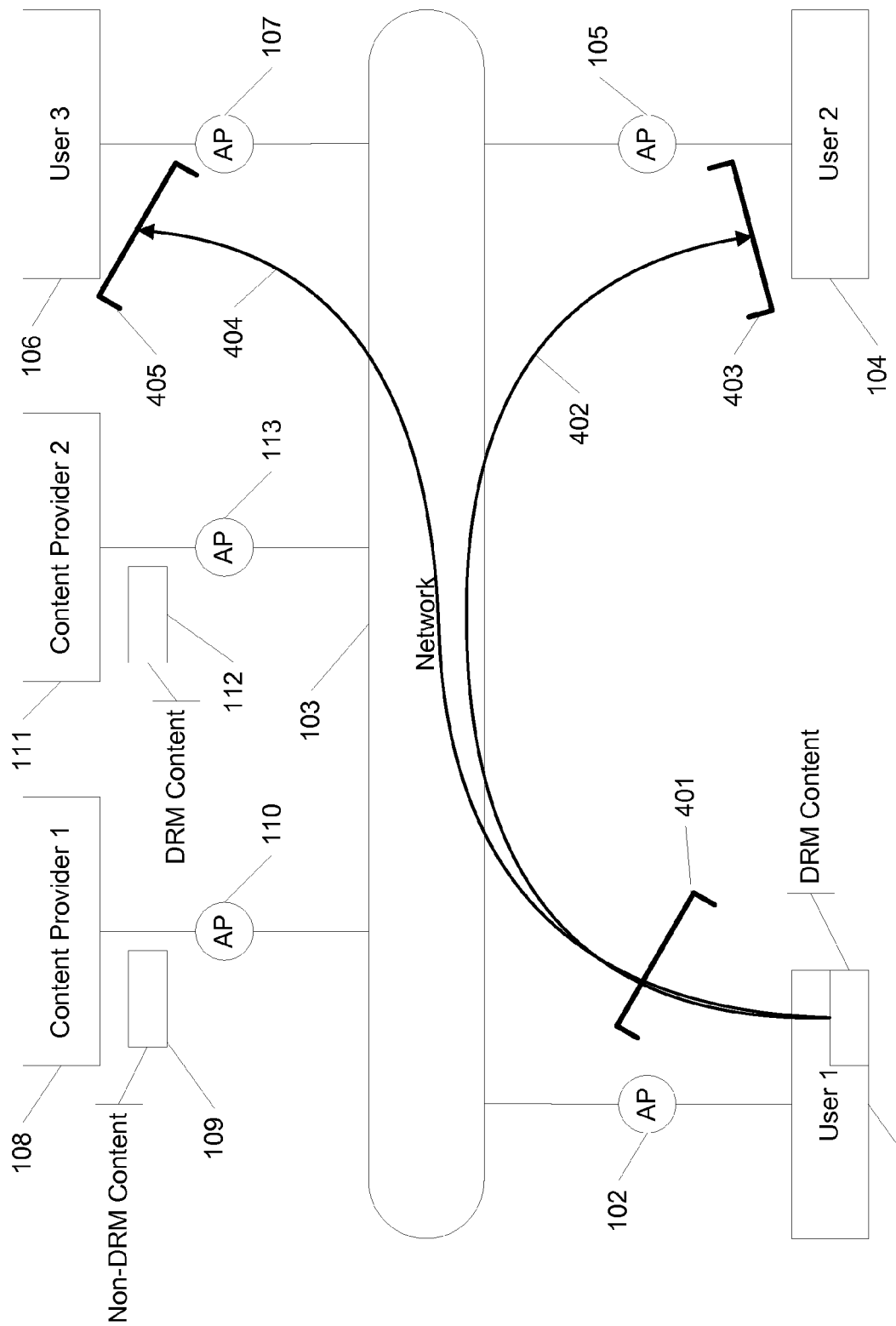
FIG. 4 shows protected content being transmitted from a first user to other users in accordance with aspects of the present invention.

FIG. 4 shows protected content being transmitted from a first user to other users in accordance with aspects of the present invention. User 1 101 includes DRM content. The DRM content may have been created by user 1 101 or have been received from a remote source. Here, user 1 101 transmits a Rights Object to users 2 104 and 3 106 that permit users 2 and 3 to view the DRM-content. If the Rights Object is not transmitted by user 1 101 or is not accepted by the users 2 104, 3 106, then the users may not be able to view the DRM-content as shown by DRM protections 401, 403, and 405.

Figure 5:
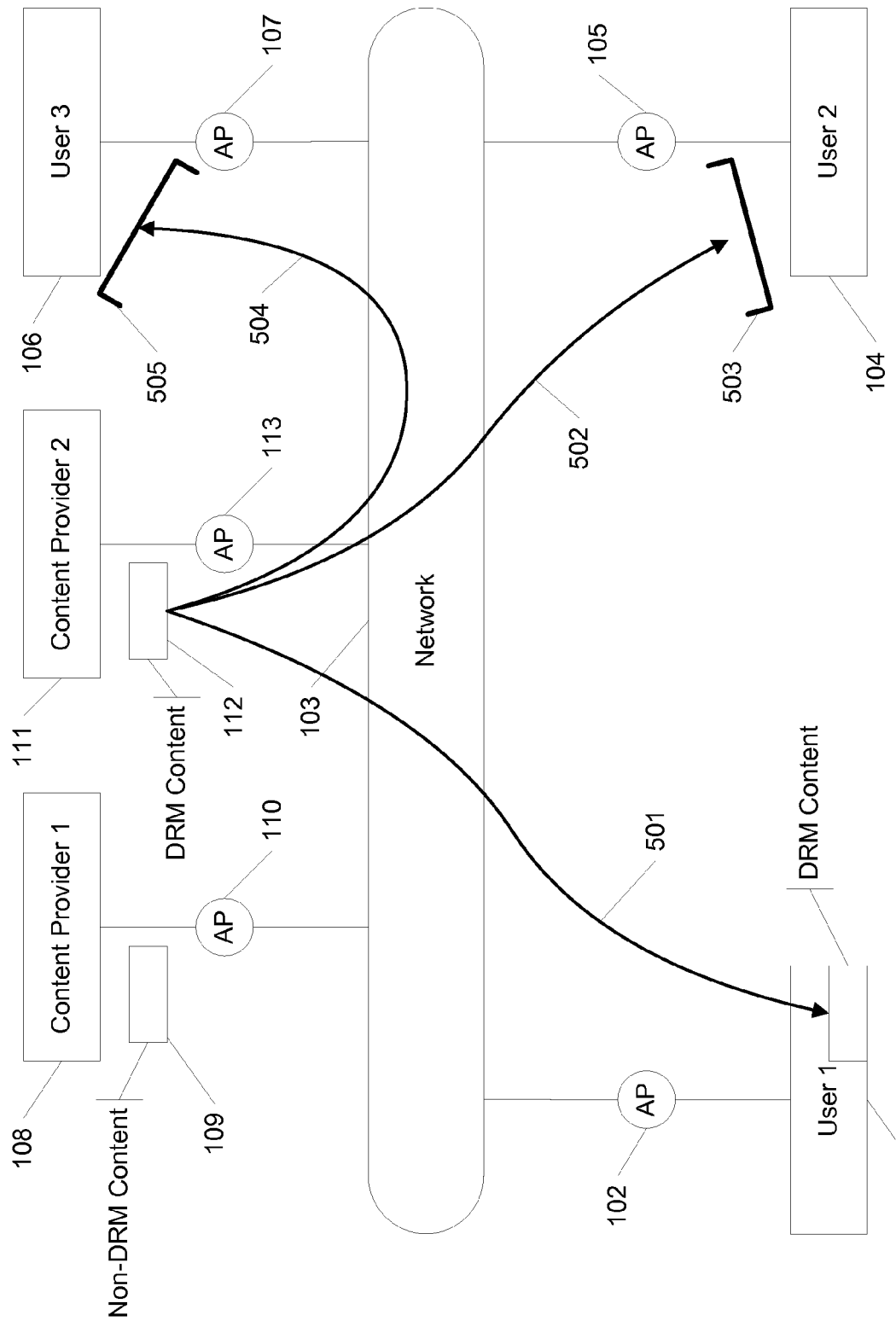
FIG. 5 shows protected content being transmitted from a first content provider to various users in accordance with aspects of the present invention.

FIG. 5 shows protected content being transmitted from a first content provider to various users in accordance with aspects of the present invention. Content Provider 2 111 transmits DRM content 112 to users 1 101, user 2 104, and user 3 106. Here, the Rights Object for DRM content may have been already transmitted from user 1 101 to the other users. If the Rights Object was not previously transmitted by user 1 101 or is not accepted by the users 2 104, 3 106, then the users may not be able to view the DRM-content as shown by DRM protections 503 and 505.

Figure 6:
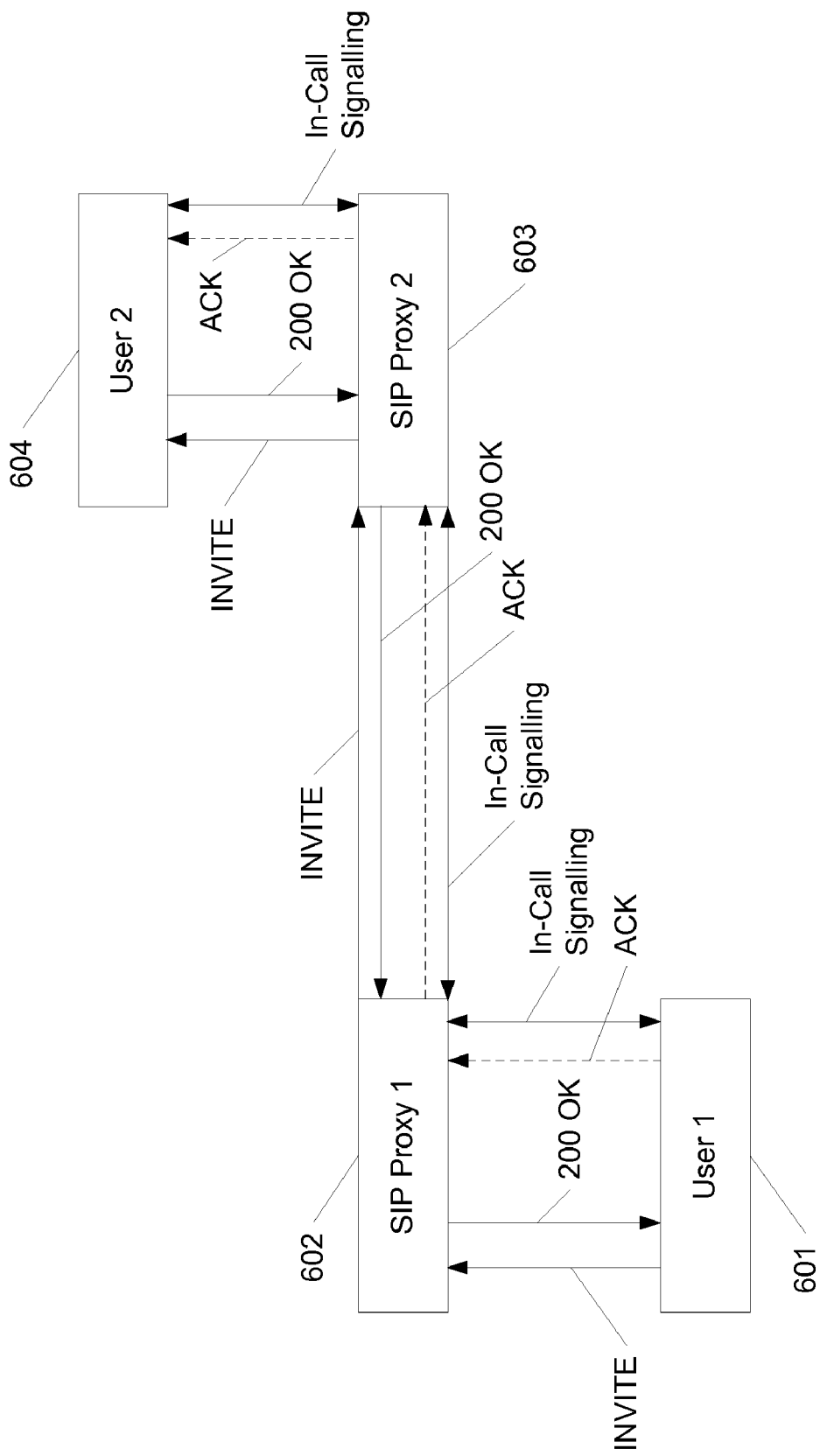
FIG. 6 shows the establishment of a connection using SIP in accordance with aspects of the present invention.

FIG. 6 shows the establishment of a connection using SIP in accordance with aspects of the present invention. FIG. 6 shows a conventional INVITE/200OK procedure using session initiation protocol with various Rights Objects being able to be transmitted between users. User 1 601 sends an INVITE to SIP Proxy 1 602, who then accepts the INVITE via 200 OK message. The SIP Proxy 1 602 then sends the INVITE (or a related INVITE) to SIP Proxy 2 603. SIP Proxy 2 603 then accepts the INVITE via 200 OK message. Next, the SIP Proxy 2 603 sends the INVITE (or another related INVITE) to user 2 604. User 2 604 then accepts the INVITE and sends back 200 OK message. Through this procedure, an in-call signaling path is established. It is appreciated that the various components may or may not acknowledge the receipt of the 200 OK messages via an ACK message as shown by dashed lines in FIG. 6.

Figure 7:
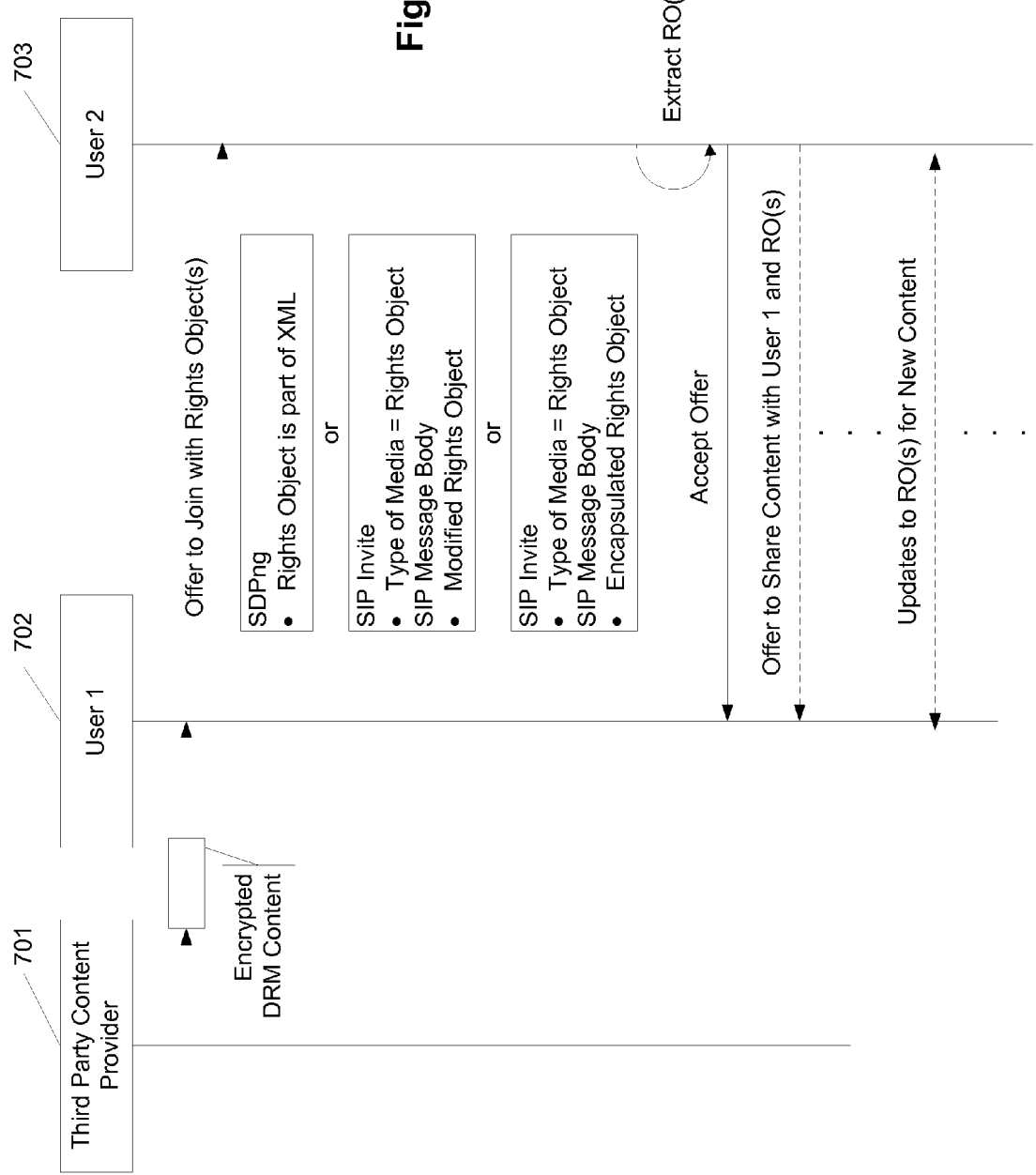
FIG. 7 shows a user transmitting a Rights Object to another user in accordance with aspects of the present invention.

FIG. 7 shows a user transmitting a Rights Object to another user in accordance with aspects of the present invention. Here, third-party content is shared by User 1 702.

User 1 702 wants to share a file he received from a third-party content provider 701 with user 2 703. The file has been encrypted by the content provider in order to make sure that only users belonging to the domain are able to use the file and that they respect the usage rights. In this regards, third-party content provider 701 sends encrypted content to User 1 702. User 1 702 then sends an offer to join to User 2 703 where the offer to join also includes one or more Rights Objects.

User 1 702 starts an offer/answer with user 2 703. In the media line, User 1 702 includes the Rights Object for the DRM protected content corresponding to the media being protected as part of the SIP INVITE (the Offer).

Merely attempting to add the RO to the INVITE message is difficult since the RO is an XML object while XML cannot be included in an SDP description.

The following describes two approaches to this issue. First, one may use SDPng. Second, one may use the body field of the SIP INVITE message.

The IETF MMUSIC working group is developing the next generation SDP protocol called SDPng to overcome the limitations designers and implementers have faced in SDP. SDPng is XML based protocol so including an RO object is straightforward. The RO object is specified using XML and the elements can be included in the SDPng.

The RO object can be carried in the SIP message body during the session set up phase. When using the SIP message body, one may then correlate the RO contained in this body with the media line the RO to which it applies. Here, this is shown by the modified RO in FIG. 7. This may be done by 1) declaring in the SDP media line an attribute that declares that the stream is protected and 2) extending the RO XML element with some indication of the media line to which the DRM protection applies. For example, this may be done by referencing the label (a=label) attribute associated with the media line (m=) in the SDP sent by the client.

One another way to associate the RO element in the SIP body with the media is to create a new XML element that encapsulates the RO object and the label attribute associated with the media in the SDP. This way there is no need to modify the RO object. The following describes that the association between the media and the RO object is achieved using the label attribute in each media line. This could also be achieved using the SDP "mid" attribute which uniquely identifies a media stream.

A new mime type can to be defined for this extended RO. For descriptive purposes, the mime type is referred to as "application/DRM-RO+xml." This is included in the content-type header of the SIP messages.

The following gives an example of an SIP INVITE message with the RO attribute and the new mime type.

```
INVITE sip:user1@hub1.example.com SIP/2.0
    Via: SIP/2.0/UDP hub3.example.com
    From: sip:13034513355@hub3.example.com
    To: sip:13039263142@hub1.example.com
    Call-ID: DEN1231999021712095500999@hub1.example.com
    CSeq: 8348 INVITE
    Contact: <sip:user1@example.com>
    Content-Length: 436
    Content-Type: multipart/mixed; boundary=unique-boundary-1
```

-continued

```
MIME-Version: 1.0
--unique-boundary-1
Content-Type: application/SDP; charset=ISO-10646
v=0
o=user1 2890844526 2890842807 IN IP4 126.16.64.4
s=DRM seminar
c=IN IP4 MG122.example.com
m=audio 9092 RTP/AVP 97 98
a=label:1
a=rtpmap:97 AMR/8000
a=fmtp:97 octet-align=1
a=rtpmap:98 RTP.ENC.AESCM128/8000
a=fmtp:98 opt=97;
ContentID="content1000221@ContentIssuer.com";
m=video 5600 RTP/AVP 96 100
a=label:2
a=rtpmap:96 H263/90000
a=rtpmap:100 RTP.ENC.AESCM128/90000
a=fmtp:100 opt=99;
ContentID="content6188164@ContentIssuer.com";
--unique-boundary-1
    Content-type: application/DRM-RO+xml
        <DRM-RO>
          <Media label="1" type="audio" />
          <Actual DRM Object >
          </Actual DRM Object>
        </DRM-RO>
    --unique-boundry-1
        <DRM-RO>
          <Media label="2" type="video" />
          <Actual DRM Object>
          </Actual DRM Object
        </DRM-RO>
    --unique-boundry-1
```

In the above example, user 1 702 sends an SIP INVITE message with audio and video media. Both the audio and video media are DRM protected. In the media line 2 payload types are declared indicating that the sender could either send encrypted or un-encrypted data. The media streams are identified by their label attribute. The content-type header indicates that this is an multipart/mixed MIME message. The INVITE message body consists of two DRM-RO object corresponding to the audio and the video media. The DRM-RO object encapsulates the RO object and the media attribute.

When user 2 703 receives this SIP INVITE message, it knows from the SDP that both the audio and the video media streams are protected and the body of the SIP body consists of the RO object. If user 2 703 wishes to take this call, it parses the body of the SIP message to extract the RO object for each media.

The user 2 703 (answerer) needs to accept the offer for the DRM encrypted content in his answer (by accepting the offered payload type). If it also wishes to share DRM encrypted content with user 1 702, it also needs to include the RO as part of his answer. If it does accept the payload type but does not specify a RO, user 1 702 will send DRM protected data to user 2 703, while user 2 703 will send non DRM protected data to user 1 702.

In other words, the RO itself has no offer/answer implications. It is only a declarative attribute that refers to the RO associated with the RTP stream in the sending direction.

When user 1 702 completes sharing the DRM protected file with user 2 703, user 1 702 may want to start sharing another file. User 1 702 at this point needs to update the RO. This can also be done through the offer/answer model. User 1 702 will update its offer with the new RO.

Figure 8:
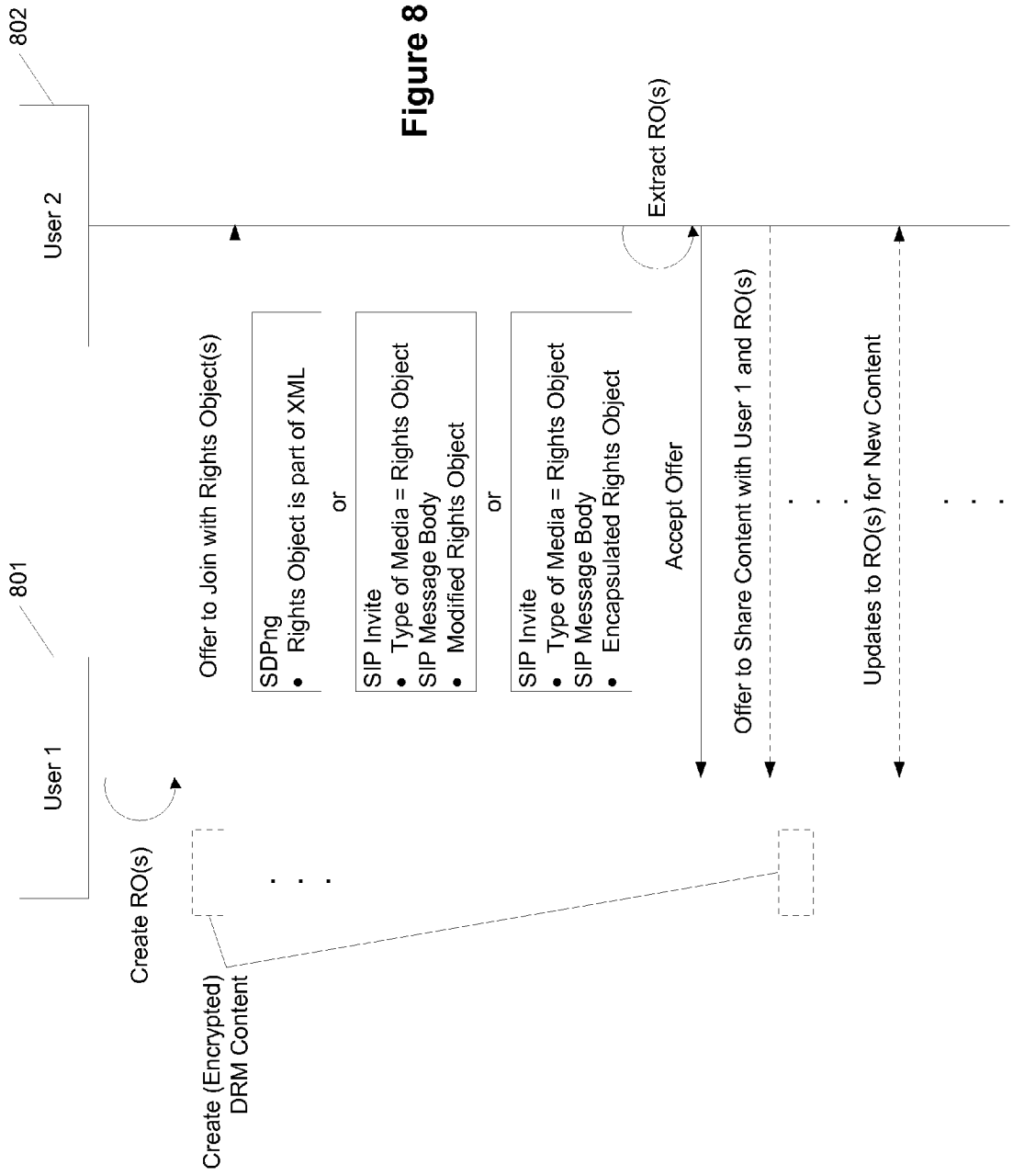
FIG. 8 shows a user transmitting a locally generated Rights Object to another user in accordance with aspects of the present invention.

FIG. 8 shows a user transmitting a locally generated Rights Object to another user in accordance with aspects of the present invention. Here, the user 1 801 shares personal content with user 2 802

The difference from the preceding use case is that the content user 1 801 wants to share, is not coming from a third-party. The content could be the live camera view from user 1 801 phone or any multimedia file user 1 801 would have pre-recorded. Unlike the previous use case, it is likely that the content was not authored by a content provider but by user 1 801 himself and the objective is not to protect a third party rights but user 1 801's content itself.

The same mechanism as in the previous use case can be done. The difference is only that user 1 801 needs to create the RO himself and possibly encrypt the content on the fly as it is being sent.

User 1 801 relies on the DRM domain mechanism to make sure that user 2 802 is properly authenticated and will be abiding to the RO rules.

Figure 9:
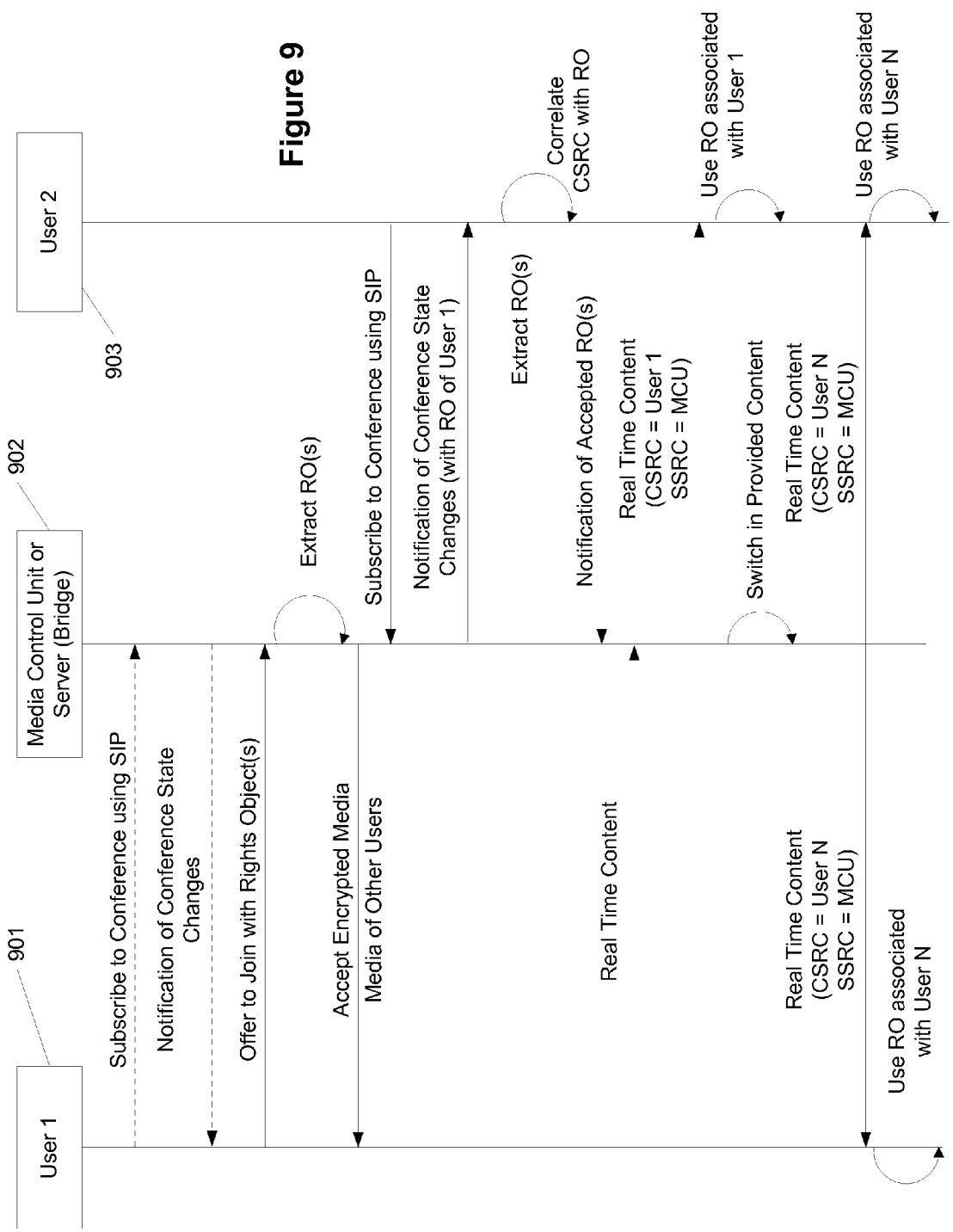
FIG. 9 shows a user transmitting a Rights Object to other users via a central server or Media Control Unit in accordance with aspects of the present invention.

FIG. 9 shows a user 1 901 transmitting a Rights Object to other users (user 2 903) via a central server or Media Control Unit 902 in accordance with aspects of the present invention. Here, multiple parties share the DRM content. Here, a central server or media control unit 902 may include one or more inputs that receive information from user devices, one or more outputs that transmit Rights Objects and protected content to user devices, and one or more storages that store one or more Rights Objects from the user devices.

In a multiparty conference session, multiple participants (user 1 901 and user 2 903) are connected to a conference server or "bridge" or MCU 902. Each user 901, 903 may have point-point signaling (SIP) and media session (RTP) session established.

One or more users may wish to share some DRM protected content with the other users. Since the content is protected, the MCU 902 will not modify the encrypted content of the RTP packet but will just switch between the different content (for example, switching between different videos). Alternatively, the MCU 902 may attempt to mix the videos. However, mixing the videos may run afoul of various DRM content provisions.

The MCU may switch between the different streams according to different policies. The different policies may be based, for instance, on end-point media control (meaning each participant can send a request to the MCU 902 to customize the media that it wants to receive from the conference server). Alternatively, the server can choose the media stream it wants to send to all the participants (for instance, an active speaker, moderator etc.).

Each user may perform a separate offer/answer negotiation with the MCU as described in the point-to-point DRM sharing use case.

As shown in 9, User 901 may send the extended right objects as part of the offer/answer for each of the media he wants to protect (similar to the SIP INVITE message as explained above). The MCU 902 next accepts accept the encrypted media but will not specify any RO. This means that the 200 OK message from the MCU 902 to user 1 901 there is a payload type for the encrypted media, but the body of the 200 OK message will not contain any RO object. The user may not consider this an error because the user knows that it is joining a conference. Also, it will learn about the specific RO object through another procedure described below.

When the MCU 902 sends back 200 OK message to user 1 901, the MCU 902 does not include the RO object because the MCU 902 will forward to user 1 901 the media of multiple other users who have each encrypted their own media according to their own right objects. Accordingly, as the user 1 901 needs access to other media, it will receive the Rights Objects in due course. This notification can be solved through SIP Subscribe/Notification mechanism as explained below.

As with SIP, users in a conference subscribe to the conference state using a SUBSCRIBE method of SIP. Conference state changes are notified to the participants using SIP NOTIFY.

For instance, user 1 901 has joined the conference and has signaled his media Right Objects to the MCU as part of the offer/answer. Next, user 2 903 joins the conference. User 2 903 be notified by the MCU 902 that user 1 901 is in the conference. This notification can be extended with user 1 901's ROs. This can be done by inserting the RO XML in the conference-info/users/user/endpoint/media information of the notification which is defined in http://www.ietf/org/internet-drafts/draft-ietf-sipping-conference-package-12.txt.

In the IETF draft http://www.ietf.org/internet-drafts/draft-ietf-sipping-conference-package-12.txt, the conference state is notified using XML. The media element in the conference state specifies the end point (or end user) media streams characteristics like media type, SSRC, label etc. The following describes that the media XML element can be extended to have another sub-element called DRM-RO. This element specifies the RO object associated with that media. This sub-element is an optional element in the media element, hence where there is no encryption the DRM-RO sub-element would not be present.

The media element from the conference package draft may be as presented below.

```
<media id="1">
    <display-text>main audio</display-text>
    <type>audio</type>
    <label>34567</label>
    <src-id>534232</src-id>
    <status>sendrecv</status>
</media>
```

This media element can be extended with the RO object as

```
<media id="1">
    <display-text>main audio</display-text>
    <type>audio</type>
    <label>34567</label>
    <src-id>534232</src-id>
    <status>sendrecv</status>
    <DRM-RO>
    (An example Domain RO is illustrated below)
    ......
    </DRM-RO>
</media>
```

The conference server 902, when it sends the notification message, may include the RO object with the corresponding media. The MCU or the conference server 902, when it receives the SIP INVITE message from each participant 901, 903, it parses the SIP body and extracts the RO object for each corresponding media which is co-related using the label attribute. When the MCU 902 sends the conference state in the NOTIFY message, it includes the RO object for the corresponding media in the media element as described above.

The remaining step is the application of the correct RO to decrypt an incoming packet from the MCU 902. In other words, a participant can first identify from which participant the RTP packet comes from and apply the correct RO for this participant. This can be done by using the RTP CSRC field.

When the MCU 902 forwards media from user 1 901 to user 2 903, it creates a new RTP packet with the MCU SSRC but includes the SSRC of user 1 901 as the only CSRC in the CSRC list. Also through the notification message from the MCU, each participant is aware of the SSRC of each media sender i.e., SSRC of each media stream which an end user is sending. Thus user 2 903 is aware of SSRC of each of the media stream of user 1 901. Thus when MCU is sending the video of user 1 901 to user 2 903, it would include the SSRC of the MCU as the SSRC and the SSRC of the user 1 901 as the CSRC. When user 2 903 receives this RTP packet, it correlates the CSRC to this list of SSRC it has already created through the notification. Based on that it can use the correct RO object (if the media is encrypted) to decrypt the media.

As in the point-to-point use case, not only can this mechanism be used to protect third party content but also content that would be unprotected on the user phone or the real-time content captured by the live camera/microphone.

The following provides an example of a Domain Rights Object that may be used in accordance with one or more aspects of the present invention.

Domain RO Example:

```
<roap:protectedRO
    xmlns:roap="urn:oma:bac:dldrm:roap-1.0"
    xmlns:ds="http://www.w3.org/2000/09/xmldsig#"
    xmlns:xenc="http://www.w3.org/2001/04/xmlenc#"
    xmlns:o-ex="http://odrl.net/1.1/ODRL-EX"
    xmlns:o-dd="http://odrl.net/1.1/ODRL-DD"
    xmlns:xsi="http://www.w3.org/2001/XMLSchema-instance">
    <roap:ro id="n8yu98hy0e2109eu09ewf09u" domainRO="true" version="1.0"
        riURL="http://www.ROs-r-us.com">
      <riID>
       <keyIdentifier xsi:type="roap:X509SPKIHash">
         <hash>aXENc+Um/9/NvmYKiHDLaErK0fk=</hash>
       </keyIdentifier>
      </riID>
      <rights o-ex:id="REL1">
       <o-ex:context>
        <o-dd:version>2.0</o-dd:version>
        <o-dd:uid>RightsObjectID</o-dd:uid>
       </o-ex:context>
       <o-ex:agreement>
        <o-ex:asset>
         <o-ex:context>
          <o-dd:uid>ContentID</o-dd:uid>
         </o-ex:context>
```

```
          <o-ex:digest>
           <ds:DigestMethod Algorithm="http://www.w3.org/2000/09/xmldsig#sha1"/>
           <ds:DigestValue>bLLLc+Um/5/NvmYKiHDLaErK0fk=</ds:DigestValue>
          </o-ex:digest>
          <ds:KeyInfo>
           <xenc:EncryptedKey>
            <xenc:EncryptionMethod Algorithm="http://www.w3.org/2001/04/xmlenc#kw-aes128"/>
              <ds:KeyInfo>
                <ds:RetrievalMethod URI="#K_MAC_and_K_REK"/>
              </ds:KeyInfo>
             <xenc:CipherData>
                <xenc:CipherValue>EncryptedCEK</xenc:CipherValue>
               </xenc:CipherData>
              </xenc:EncryptedKey>
            </ds:KeyInfo>
          </o-ex:asset>
          <o-ex:permission>
          <o-dd:play/>
          </o-ex:permission>
         </o-ex:agreement>
       </rights>
       <signature>
        <ds:SignedInfo>
         <ds:CanonicalizationMethod Algorithm="http://www.w3.org/2001/10/xml-exc-c14n#"/>
               <ds:SignatureMethod
         Algorithm="http://www.rsasecurity.com/rsalabs/pkcs/schemas/pkcs-1#rsa-pss-default"/>
          <ds:Reference URI="#REL1">
           <ds:Transforms>
            <ds:Transform Algorithm="http://www.w3.org/2001/10/xml-exc-c14n#"/>
           </ds:Transforms>
            <ds:DigestMethod Algorithm="http://www.w3.org/2000/09/xmldsig#sha1"/>
            <ds:DigestValue>j6lwx3rvEPO0vKtMup4NbeVu8nk=</ds:DigestValue>
           </ds:Reference>
          </ds:SignedInfo>
          <ds:SignatureValue>j6lwx3rvEPO0vKtMup4NbeVu8nk=</ds:SignatureValue>
          <ds:KeyInfo>
           <roap:X509SPKIHash>
            <hash>aXENc+Um/9/NvmYKiHDLaErK0fk=</hash>
           </roap:X509SPKIHash>
          </ds:KeyInfo>
        </signature>
        <encKey Id="K_MAC_and_K_REK">
         <xenc:EncryptionMethod
          Algorithm="http://www.w3.org/2001/04/xmlenc#kw-aes128"/>
         <ds:KeyInfo>
          <roap:domainID>Domain-XYZ-001</roap:domainID>
         </ds:KeyInfo>
         <xenc:CipherData>
<xenc:CipherValue>32fdsorew9ufdsoi09ufdskrew9urew0uderty5346wq</xenc:CipherValue>
         </xenc:CipherData>
        </encKey>
       </roap:ro>
       <mac>
        <ds:SignedInfo>
         <ds:CanonicalizationMethod Algorithm="http://www.w3.org/2001/10/xml-exc-c14n#"/>
         <ds:SignatureMethod
          Algorithm="http://www.w3.org/2000/09/xmldsig#hmac-sha1"/>
         <ds:Reference URI="#n8yu98hy0e2109eu09ewf09u">
          <ds:Transforms>
           <ds:Transform Algorithm=http://www.w3.org/2001/10/xml-exc-c14n#/>
          </ds:Transforms>
          <ds:DigestMethod Algorithm="http://www.w3.org/2000/09/xmldsig#sha1"/>
          <ds:DigestValue>j6lwx3rvEPO0vKtMup4NbeVu8nk=</ds:DigestValue>
         </ds:Reference>
        </ds:SignedInfo>
        <ds:SignatureValue>j6lwx3rvEPO0vKtMup4NbeVu8nk=</ds:SignatureValue>
        <ds:KeyInfo>
         <ds:RetrievalMethod URI="#K_MAC_and_K_REK"/>
        </ds:KeyInfo>
       </mac>
      </roap:protectedRO>
```

General Purpose Mobile Terminal

Figure 10:
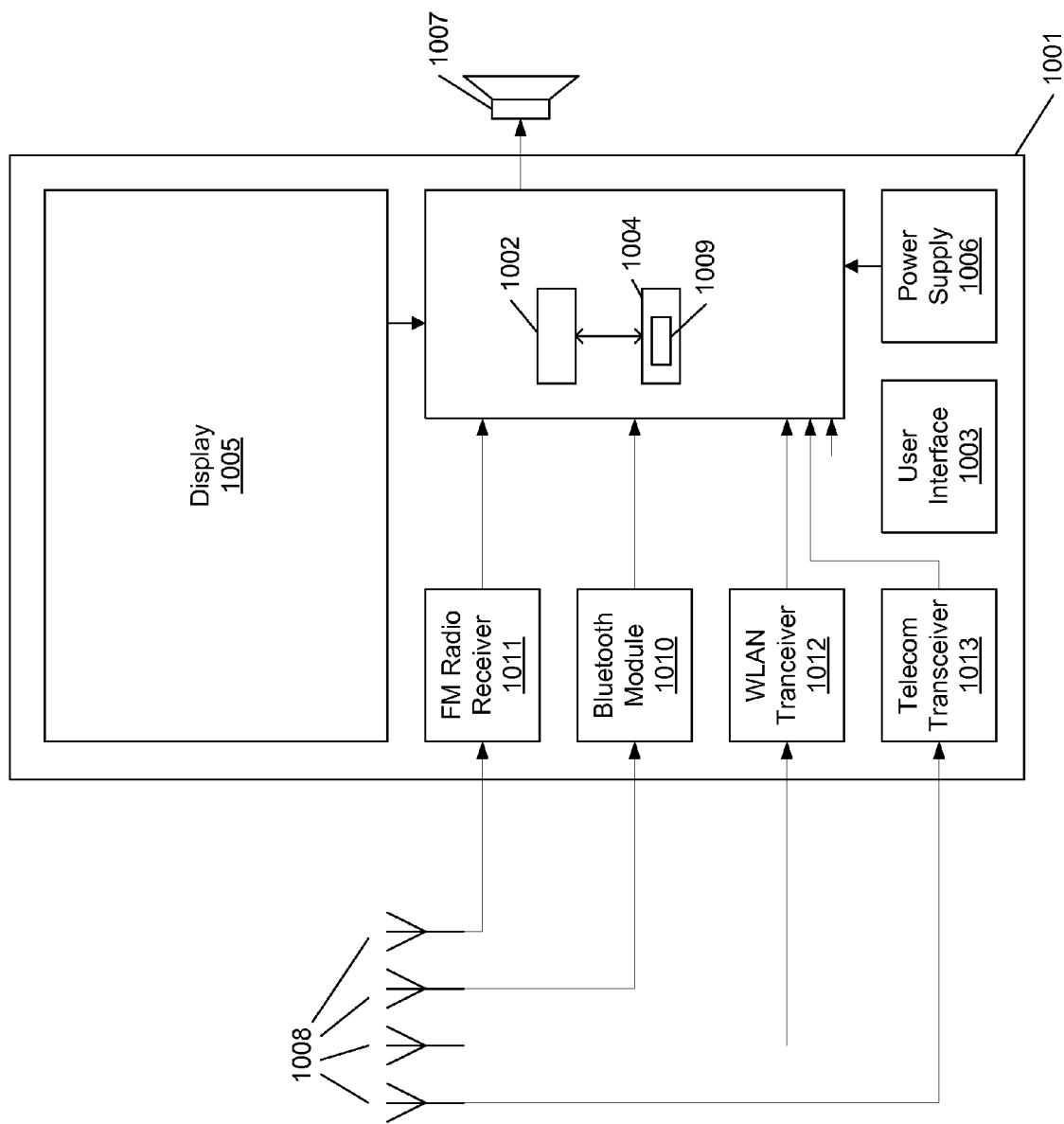
FIG. 10 shows an illustrative example of a user device that may be used in combination with one or more aspects of the present invention.

FIG. 10 shows an illustrative operating environment of user device 1001. User device 1001 may include processor 1002 connected to user interface 1003, memory 1004 and/or other storage, and display 1005. User device 1001 may also include power supply 1006 (which may include a battery or other power source), speaker 1007, and antenna(s) 1008 (represented separately but may be combined). User interface 1003 may further include a keypad, touch screen, voice interface, one or more arrow keys, joy-stick, data glove, mouse, roller ball, touch screen, display screen, and/or other human-computer interface mechanism(s).

Computer executable instructions and data used by processor 1002 and other components within user device 1001 may be stored in a computer readable memory 1004. The memory 1004 may be implemented with any combination of read only memory modules or random access memory modules, optionally including both volatile and nonvolatile memory and optionally being detachable. Software 1009 may be stored within memory 1004 and/or other storage to provide instructions to processor 1002 for enabling user device 1001 to perform various functions. Alternatively, some or all of the computer executable instructions of the user device 1001 may be embodied in hardware or firmware (not shown).

User device 1001 may be configured to send and receive transmissions based on the Bluetooth standard, through a specific Bluetooth module 1010. Additionally, user device 1001 may also be configured to receive, decode and process transmissions through FM/AM radio receiver 1011, wireless local area network (WLAN) transceiver 1012, and telecommunications transceiver 1013. In one aspect of the invention, user device 1001 may receive radio data stream (RDS) messages. User device 1001 may be equipped with additional and/or different receivers/transceivers, e.g., one or more of a Digital Audio Broadcasting (DAB) receiver, a Digital Radio Mondiale (DRM) receiver, a Forward Link Only (FLO) receiver, a Digital Multimedia Broadcasting (DMB) receiver, etc. Each receiver may be physical or logical in that hardware may be combined to provide a single receiver that receives and interprets multiple formats and transmission standards, as desired. That is, each receiver in a mobile terminal device may share parts or subassemblies with one or more other receivers in the mobile terminal device, or each receiver may be an independent subassembly.

One or more aspects of the invention may be usable on any data processing device on which software is validated and/or executed, including but not limited to, desktop computers, laptop and portable computers, personal digital assistants, smart phones, personal communication devices, servers, routers, and the like. Software validation and/or authentication may be accomplished, in part, through the use of digital signatures.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. An apparatus comprising:
   a processor; and
   a memory storing computer executable instructions that, when executed, cause the apparatus to:
   transmit a message to a second apparatus including a rights object and information that identifies first protected content, the rights object including a key for decrypting the first protected content;
   receive an acceptance of the message from the second apparatus; and
   in response to receiving the acceptance, transmit the first protected content to the second apparatus.

2. The apparatus according to claim 1, wherein the memory further stores computer executable instructions that, when executed, cause the apparatus to:
   receive the rights object from a server.

3. The apparatus according to claim 1, wherein the memory further stores computer executable instructions that, when executed, cause the apparatus to:
   create the rights object.

4. The apparatus according to claim 1, wherein the memory further stores computer executable instructions that, when executed, cause the apparatus to: receive the protected content from a server.

5. The apparatus according to claim 1, wherein the message is a SDPng message and the SDPng message includes the rights object in an extensible mark up language (XML) format.

6. The apparatus according to claim 1, wherein the memory further stores computer executable instructions that, when executed, cause the apparatus to:
   modify a first version of the rights object, resulting in a modified version of the rights object; and
   wherein the message is a SIP message and the SIP message includes the modified version of the rights object.

7. The apparatus according to claim 1, wherein the memory further stores computer executable instructions that, when executed, cause the apparatus to:
   encapsulate a first version of the rights object, resulting in an encapsulated version of the rights object; and
   wherein the message is an SIP invite and the SIP invite includes the encapsulated version of the rights object.

8. The apparatus according to claim 1, wherein the acceptance includes a second rights object, the second rights object including a key for decrypting additional protected content received from the second apparatus.

9. The apparatus according to claim 1, the memory further stores computer executable instructions that, when executed, cause the apparatus to:
   update the rights object; and
   transmit the updated rights object to the second apparatus.

10. A method comprising:
    transmit, from a first device, a message to a second device including a rights object and information that identifies first protected content, the rights object including a key for decrypting the first protected content;
    receive an acceptance of the message from the second device; and
    in response to receiving the acceptance, transmit the first protected content to the second device.

11. The method according to claim 10, wherein the acceptance includes a second rights object, the second rights object including a key for decrypting additional protected content received from the second device.

12. The method according to claim 10, wherein the message is a SDPng message and the SDPng message includes the rights object in an extensible mark up language (XML) format.

13. The method according to claim 10, further comprising:
    modifying a first version of the rights object, resulting in a modified version of the rights object; and wherein the message is a SIP message and the SIP message includes the modified version of the rights object.

14. The method according to claim 10, further comprising:
encapsulating a first version of the rights object, resulting in an encapsulated version of the rights object; and
wherein the message is an SIP invite and the SIP invite includes the encapsulated version of the rights object.

15. The apparatus of claim 1, wherein the memory further stores computer executable instructions that, when executed, cause the apparatus to:
receive information from a first user at the first device;
encrypt the information, resulting in second protected content;
generate a user rights object for the second protected content; and
transmit the second protected content and user rights object.

16. A memory comprising computer executable instructions that, when executed, causes an apparatus to:
transmit a message to a first device including a rights object and information that identifies first protected content, the rights object including a key for decrypting the first protected content;
receive an acceptance of the message from the first device; and
in response to receiving the acceptance, transmit the first protected content to the second device.

17. The memory according to claim 16, wherein the computer executable instructions, when executed, further causes the apparatus to:
receive information from a first user at the apparatus;
encrypt the information, resulting in second protected content;
generate a user rights object for the second protected content; and
transmit the second protected content and user rights object.

18. The memory according to claim 16, wherein the message is a SDPng message and the SDPng message includes the rights object in an extensible mark up language (XML) format.

19. The memory according to claim 16, wherein the computer executable instructions, when executed, further causes the apparatus to:
modify a first version of the rights object, resulting in a modified version of the rights object; and
wherein the message is a SIP message and the SIP message includes the modified version of the rights object.

20. The memory according to claim 16, wherein the acceptance includes a second rights object, the second rights object including a key for decrypting additional protected content received from the second user device.

21. The memory according to claim 16, wherein the computer executable instructions, when executed, further causes the apparatus to:
update the rights object; and
transmit the updated rights object to the second user device.

22. The memory according to claim 16, wherein the computer executable instructions, when executed, further causes the apparatus to:
create the rights object.

* * * * *